Sept. 12, 1939.　　　W. S. GRAHAM　　　2,172,971
DIRECT CONNECTED TRACTOR IMPLEMENT
Filed Feb. 24, 1938　　　2 Sheets-Sheet 1
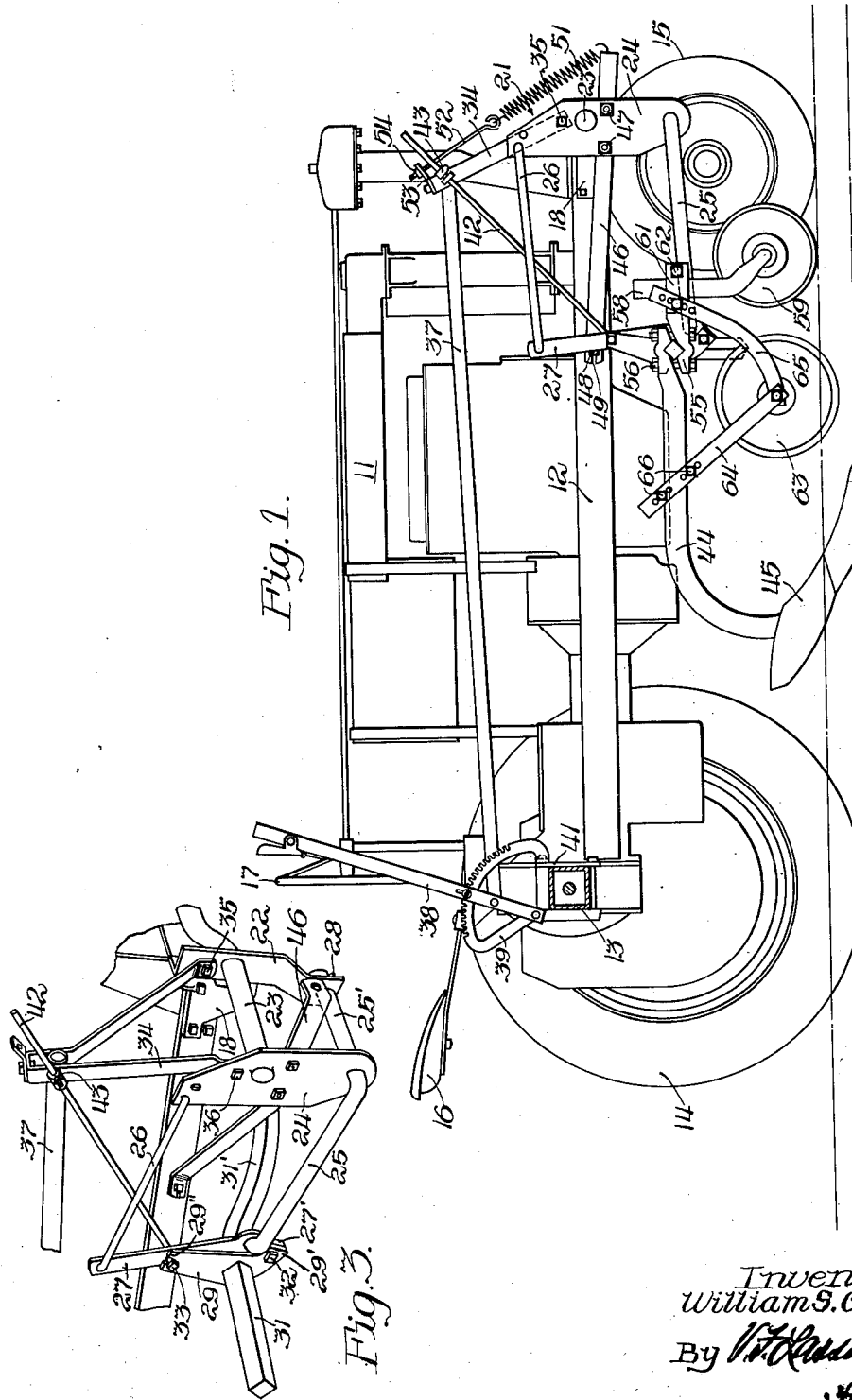
Inventor
William S. Graham.

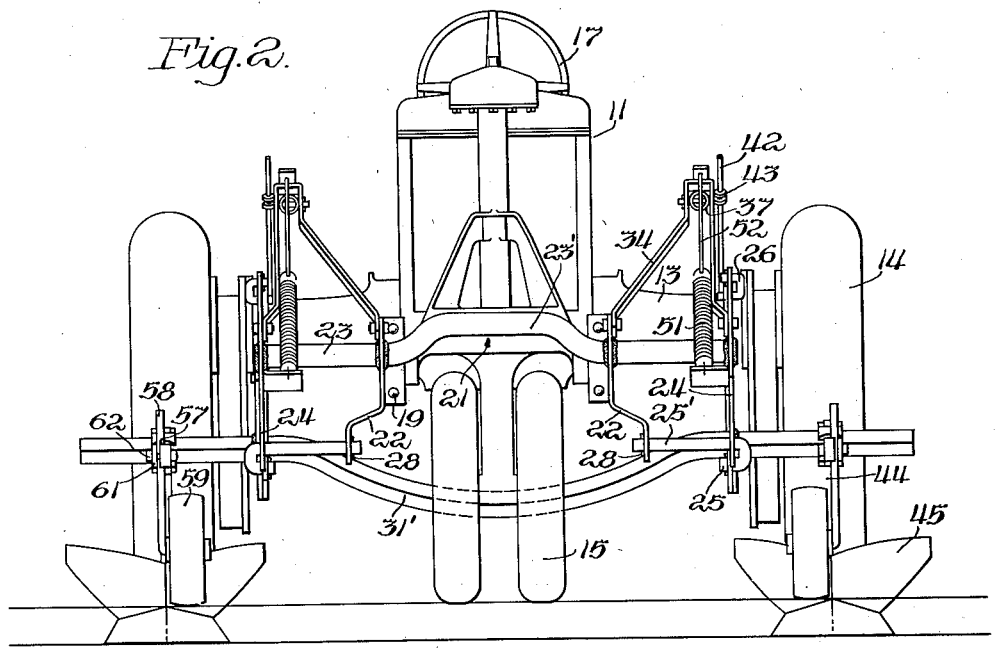
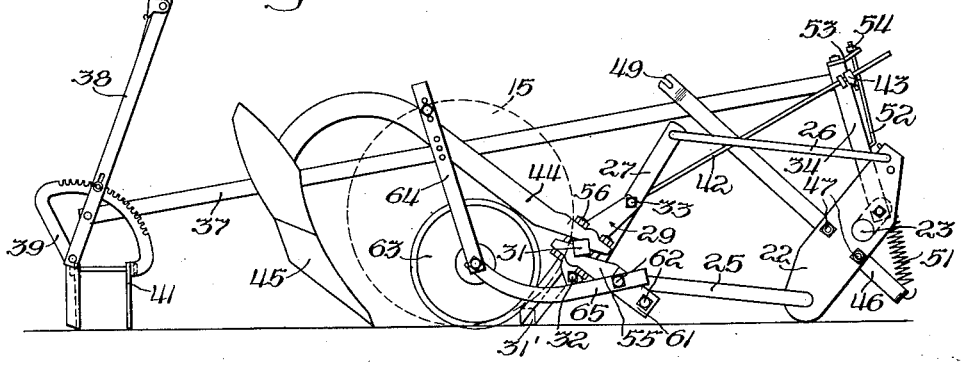

Patented Sept. 12, 1939

2,172,971

UNITED STATES PATENT OFFICE 2,172,971

DIRECT CONNECTED TRACTOR IMPLEMENT

William S. Graham, Canton, Ill., assignor to International Harvester Company, a corporation of New Jersey Application February 24, 1938, Serial No. 192,225

14 Claims. (Cl. 97—47)

This invention relates to direct connectable agricultural implements for tractors, and particularly to such implements which have a transversely extending tool bar that is arranged for vertical movement under the tractor body.

With implements of this type, none is so designed that the supporting structure and the tool bar structure are both demountable from or connectable to the tractor together or as a unit wherein the tractor wheels will be free to position themselves with respect to the transversely extending bar.

Also, with such implements, a structure must be provided that is different from the ordinary direct connectable implements mounted where the transverse bar may be forward or rearward of the tractor, since the tool bar must not only be movable vertically with respect to the under portion of the tractor, but must provide sufficient height at the point of connection of the implements therewith at the sides of the tractor; that is, implements which require the use of a tool beam and which dig rather deeply into the soil. Also, the entire structure must be heavier and more rigid than the structure where only light tools are used. The tool bar, in itself, for this type of implement necessarily has to be of rather large size in order to carry the strains that are set up during the ground-working operation. Consequently, a rigid and heavy supporting structure must be provided to take care of this additional size of tool bar and of the heavier tools.

It is the principal object of this invention to provide a direct connectable implement of the type where the tool bar extends transversely under the tractor, which will be removable from or attachable to the tractor as a unit.

It is another object of this invention to provide a tool bar that is especially adapted for use under the tractor, that is of such size as to carry the heavy implements, and of such shape as to give additional height for the mounting of these implements at the sides of the tractor.

It is another object of this invention to provide suitable supporting structure for tool bars of this heavy type, which will hold the same in alinement with the tractor during the groundworking operation.

In general, the invention has to do with a direct connectable implement in which the tool bar extends transversely across and under the tractor and is arranged to have vertical movement to lift the implements out of the groundworking position to a position of transport on the tractor, wherein there is a supporting structure adaptable for attachment to the forward end of the tractor in front of a steerable wheel structure thereof, and means for so attaching the tool bar structure to this supporting structure that the same may be pivotable to lower the tool bar sufficiently toward the ground as to permit withdrawal of the steerable wheels thereover as the tractor is moved out of or into its position of attachment of the supporting structure with its forward end thereof. The tool bar is depressed or bowed along its portion directly under the tractor, and this portion will contact with the ground when the implement structure is collapsed for the purpose of removing the same from the tractor. The portions of the tool bar extending toward the sides of the tractor are sufficiently higher than the depressed portion of the drawbar to provide for attachment of implements that need sufficient height to allow for deep digging into the ground.

The supporting structure includes parallel link members which extend from the front of the tractor rearwardly along the sides thereof, and, in order to provide a rigid construction for the support of the tool bar, these links have elongated, transversely extending portions at their points of connection at the front of the tractor.

For other objects and a better understanding of the invention, reference may be had to the following detailed description taken in connection with the accompanying drawings, in which:

Figure 1 is an elevational side view of a tractor having the direct connectable implement of the present invention attached to its forward end;

Figure 2 is a front elevational view, showing particularly the shape of the tool bar and the attachment of the supporting structure of the tractor;

Figure 3 is a detail view of that part of the direct connectable implement showing the specific features of the invention; and, Figure 4 is a showing of the implement in its detached position relative to the tractor wheels at the time of mounting or demounting of the implement on the tractor.

In the figures, there is shown a tractor designated generally at 11, having longitudinally extending side portions 12, a rear axle structure 13 with rear wheels 14, and a front steerable wheel structure 15 adapted to be operated from the operator's station 16 by a steering wheel 17. The forward ends of the side sills 12 have bracket portions 18 particularly adapted to receive attaching bolts 19 for the attachment of an implement supporting frame, generally indicated at 21, having thereon vertically extending angle members 22 arranged to cooperate, for attachment of the supporting frame, with the bracket portions 18 on the front of the tractor and to be held by the bolt attaching means 19.

The frame structure 21 includes a transversely extending member 23, to which the vertically extending members 22 are rigidly secured, such as by welding, and which have at their outer ends, spaced from the vertical members 22, other vertically extending members or plates 24. To these vertical members and extending rearwardly along the sides of the tractor, are attached parallel links 25 and 26, which, in turn, are pivotally connected to a tool bar supporting plate 27, Figure 3. The parallel link 25 is adapted to carry the bulk of the strains, and, with this in mind, the same has been especially designed to include a transversely extending portion 25', that extends between the spaced vertical members 24 and 22 and is held from lateral movement by a pin 28 at the inner side of the vertical member 22. The transversely extending member 23 has a mid-portion 23' that is bowed upwardly and, when on the tractor, is located substantially above and at the front side of the wheel structure 15.

Adapted to be attached to the tool bar attaching plate 27, there is an attaching means 29 carried and rigidly secured to a tool bar 31 of square shape, which tool bar extends transversely under the tractor. The attaching means 29 is curved or has a forwardly extending portion 29', which is adapted to connect with a portion 27' just beneath the connection of the parallel link 25 with the attaching plate 27. The plate 29 is attached at that location by a bolt 32. The plate 29 is also attached to the plate 27 by means of a bolt 33 adapted to seat in a slot 29" of the plate 29. By removal of the bolts 32 and 33, the tool bar structure may be removed, if desired, from the supporting frame structure 21. The slot 29" facilitates in the connecting and removal of the structure. Or, the bolt 33 may be removed to permit pivoting of the tool bar and plate 29 about the bolt 32 to give further collapse of the implement structure, if necessary, to cause the portion 31' of the tool bar to get closer to or contact the ground, when the implement is being disconnected from the tractor. It should however be understood that this last operation is not always used; the sufficient collapse is more often obtained from the pivot connected links.

Pivoted between the vertical members 22 and 24, there is an inverted V-shaped lifting arm 34 on the pivot bolts 35 and 36 in the respective members and having connected to their upper ends a lifting pipe 37, which is, in turn, connected to a movable lever 38 adapted to pivot on a quadrant 39 attachable to the rear axle structure 13 of the tractor by clamp and bolt means 41. The lever 38 is near to the operator's station 16, and, upon its operation forwardly, the lifting arm 34 will be moved forwardly about its pivot bolts and will cause a lifting link 42 to move therewith, the same being connected with the lifting arm 34 at the point of pivot of the push pipe 37 therewith and adjustable for its active length by a collar member 43. The link 42 is connected to the member 27, and thus, when the push pipe moves forwardly, the tool bar 31, with its coupled tool beams 44 and plowing tools 45, will move upwardly to remove the tools out of the ground-operating position. The reverse movement of the lifting arm 34, by pulling the lever 38 rearwardly, will lower the tool bar and its tools to their ground-working position.

In order to further make rigid the supporting frame 21 on the tractor, there are provided strap members 46 connected at their forward ends by bolts 47 to the vertically extending plates 24 of the supporting frame, and which extend rearwardly along the sides of the tractor and are attached to the side sills 12 thereof by the bolts 48. To permit easy registration of the rear ends of the strap members 46 with the bolts 48, the members 46 are provided with slots 49. The forward ends of the strap members 46 extend forwardly of the plate members 24 to provide connection for helper springs 51 that are connected at their upper ends to the lifting arm 34 by means of hook bolts 52, that pass through a bracket piece 53 and are held therein by the nut 54. The nut 54 may be adjusted to regulate the operation of the spring and may be either removed or considerably loosened when the supporting frame is to be removed from the tractor.

The tool bar, in its portion immediately under the tractor, is depressed or bowed, as indicated at 31', for two reasons,—one being to provide additional height for the attachment of the relatively high tool beams 44, such as is necessary with lister plows, and the other being to permit the removal of the entire implement as a unit from the tractor. The tool beam, when lowered for removal of the entire unit from the tractor, will be moved sufficiently toward the ground to permit the steerable wheel 15 to easily ride thereover and free the tractor from the implement (Figure 4).

At the ends of the tool bar 31 and at the sides of the tractor, the tool beams 44 are connected. The tool beam 44 at its point of connection with the beam, is notched. Connected with the square-shaped tool bar and underneath the end thereof and in registry with the underside of the tool beam, there is a clamp member 55, and, by means of bolts 56, the clamping member 55 and the end of the tool beam 44 are rigidly connected to the tool bar 31.

The side face of that portion of the clamping plate 55 which extends forwardly of the tool bar has a depression or slot 57 therein for the reception of a gauge wheel standard 58 having a gauge wheel 59 at its lower end. The standards are made secure within the slot by a clamping plate 61 attachable to the clamp 55 by bolts 62. The gauge wheel 59 may be adjusted to the desired position for regulating the plowing depth of the working tool 45 by adjustment of the gauge wheel standard 58 in the slot 57. A colter wheel 63 may be attached to this structure by means of a rearwardly extending strap 64 and a forwardly-extending strap 65, which may be adjustably attached at its forward end to the forward portion of the clamp 55 by means of one of the bolts 62. The rear strap 64 is attached by bolts 66 to the tool beam 44. All of these bolts may be loosened or removed, as desired, to facilitate the removal of the implement from the tractor.

To remove the implement from the tractor, the helper spring 51 is first released by removal or unscrewing of the nut 54 from the connecting bolt 52, after which the collar 43 of the lifting link 42 is removed to allow the lifting arm 34 to be swung freely. Then, the clamping means 41 for attaching the quadrant 39 to the rear axle 13 of the tractor is released and the same is bodily removed from the rear axle of the tractor. The lifting arm 34 is swung forwardly and this quadrant structure may be rested on the ground, as shown in Figure 4. Next, the bolts 48 are released to permit the strap members 46 to be pulled forwardly, the bolts 48 leaving the slots 49 in the ends of the strap members 46. The bolts 19 for attaching the members 22 of the supporting structure 21 to the forward end of the tractor or to the bracket portions 18 are then released and the implement is now free to be finally removed from the tractor. The supporting frame 21 will slide forwardly down over the steerable wheels 15, and, with the gauge wheels 59 and their standards 58 removed from the clamp members 55, and due to the weight of the tool bar 31, the tool bar will move forwardly, so that its portion 31' moves toward or strikes the ground. The tool beams 44 will follow the tool bar 31 and cause the tools 45 to move up on their points. The colter wheel straps may also be loosened to permit the free collapse of the tool bar and its movement toward the ground. The implement in its detached position takes the form shown in Figure 4. With the implement on the ground, the tractor is free to move rearwardly, so that the front wheels pass over the portion 31' of the tool bar with ease and the tractor is thus readily freed from the implement. In this freeing of the implement, the mid-portions 23' and 31' of the respective structures will pivot away from each other because of the arrangement of the pivotal connections of the links, thereby permitting the mid-portion 23' to readily pass down over the wheel structure 15. Thus, by so shaping the transverse members as to have their mid-portions bowed upwardly and downwardly, respectively, the links need not be of such length as not to make for steadiness or rigidity of the tool-carrying structure when working the ground, and yet permit removal of the implement from the tractor.

To attach the implement to the tractor, the reverse order of connecting the elements of the implement to the tractor is followed. The tractor is passed forwardly, so that its steering wheel rides over the tool bar and takes a position forwardly thereof for the attachment of the supporting frame 21 and of the other parts mentioned above.

From the foregoing it will thus be seen that there has been provided a tractor-mounted implement of the type in which the tool bar extends across under the tractor, between the rear and front wheels thereof, which may be removed from the tractor as a unit without disconnecting the tool bar from its supporting structure.

Also, there has been provided a structure including a tool bar with tools thereon adapted for heavy duty, such as for plowing, which is rigid and free from any lateral movement tending to throw the tools out of transverse alinement with the tractor, in an implement which is of the direct connected type. The links attaching the tool bar and its tools to the support frame are so shaped at their points of pivot with the supporting frame as to give rigidity and to permit pivot only in a vertical direction.

It shall now be understood that, while changes may be made in the specific structure, such changes are deemed to be made without departing from the spirit and scope of the present invention as defined in the appended claims.

What is claimed is:

1. In combination, a tractor having a wheel structure, a direct connectable implement structure comprising a supporting frame structure adapted for attachment to the tractor, and a transverse tool bar connected to the supporting frame under the tractor and having ground-working tools, said implement structure adapted to be collapsible, at a point between the rear thereof and its point of connection with the tractor, upon detachment from the tractor to permit the transverse bar to be movable toward the ground a sufficient distance to allow the wheel structure to pass thereover.

2. In combination, a tractor having a steerable wheel structure, and an implement structure detachably connected to the tractor including a tool bar extending transversely under the tractor in rear of the wheel structure and having ground working tools thereon, said tool bar being longitudinally spaced from the point of connection of the implement structure with the tractor and said implement structure being collapsible upon being detached from the tractor so as to permit the transverse bar to be movable toward the ground by pivoting about the working tools a sufficient distance to allow the wheel structure to pass rearwardly thereover.

3. In combination, a tractor having a forward steerable structure, a direct connected implement comprising a supporting frame adapted to be rigidly connected to the tractor forward of the steerable structure thereof, trailing connecting links carried by the supporting frame, connection means carried by the links, a transverse tool bar extending under the tractor and having ground-working tools thereon, and means on the tool bar for connecting the tool bar with its tools to the connecting means carried by the links and adapted to be relatively adjustable with respect to each other to allow lowering of the tool bar for removal of the implement from the tractor.

4. In combination, a tractor having a forward wheel structure, a direct connectable implement structure attachable to the forward end of the tractor including members extending rearwardly along the sides of the tractor, and a transverse tool bar extending under the tractor in rear of the wheel structure and connected to the side members, said bar having a depressed portion and said implement structure adapted to be collapsible at the connection of the tool bar with the side members to lower the tool bar to the ground so that the same rests on its depressed portion to allow the wheel structure to pass thereover upon removing the implement from the tractor.

5. In combination, a tractor, and a direct connectable implement including a supporting structure adapted for attachment to the tractor and a tool bar located under the tractor and connected to the supporting structure for vertical movement with respect thereto, said tool bar being bowed downwardly along its portion immediately under the tractor to give clearance for movement with respect thereto and to give sufficient height at the sides of the tractor for the mounting of working tools and their beams.

6. In combination, a tractor having a wheel structure, a direct connectable implement comprising a transverse tool-carrying structure extending under the tractor, a supporting structure for the tool-carrying structure including a transverse member adapted to extend above the wheel structure and on the opposite side from the transverse tool-carrying structure, and said transverse member being shaped along the portion immediately above the wheel structure to permit vertical pivotal movement of the supporting structure with respect to the tool-carrying structure to free itself of the wheel structure upon removing the implement from the tractor.

7. In combination, a tractor having a wheel structure, a direct connectable implement comprising a tool-carrying structure including a transverse tool bar member bowed at its portion near to the wheel structure, a supporting structure for the tool-carrying structure including a transverse member bowed at its portion near to the wheel structure and on the opposite side thereof from the bowed tool bar, at least one of the transverse members being located substantially above the wheel structure, and means interconnecting the two structures to permit pivotal movement of the transverse members so that the bowed portions tend to oppose each other to readily free themselves from the wheel structure upon removal of the implement from the tractor.

8. In combination, a tractor having a steerable forward wheel structure, a direct connectable implement comprising a tool-carrying structure including a transverse tool bar member located under the tractor and near to the forward wheel structure, a supporting structure for the tool-carrying structure including a transverse member adapted to be located on the tractor near to the forward side of the wheel structure and bowed upwardly at its mid-portion, and means interconnecting the two structures to permit forward pivotal movement of the upwardly-bowed transverse member to free itself of the wheel structure upon removing the implement from the tractor.

9. In combination, a tractor having a forward steerable wheel structure, a direct connectable implement comprising a tool-carrying structure including a transverse tool bar member having a downwardly-bowed mid-portion and located under the tractor in rear of the wheel structure, a supporting frame for the tool-carrying structure including a transverse member having an upwardly-bowed mid-portion adapted to be located in the forward end of the tractor above the wheel structure, and means for interconnecting the two structures to permit movement of the respective bowed mid-portions thereof away from each other to free the implement of the wheel structure upon removing the same from the tractor.

10. In combination, a tractor having a wheel structure, a tool-carrying structure mounted for vertical movement under the tractor and in rear of the wheel structure, a supporting structure for the tool-carrying structure mounted on the tractor forwardly of the wheel structure and including a transverse member having portions projecting beyond the sides of the tractor, vertically extending members rigidly secured in spaced relation in the projecting portions and trailing links for connecting the tool-carrying structure with the supporting structure, at least some of the links having transversely extending elongated portions at their points of connection with the supporting frame, the said elongated portions interconnecting and pivoting in the vertically extending members.

11. In combination, a tractor having a wheel structure, and an implement structure detachably connected to the tractor including a transverse tool bar adapted to be located under the tractor and having ground working tools thereon, said tool bar being longitudinally spaced from the point of connection of the implement structure with the tractor and said implement structure being collapsible upon being detached from the tractor so as to permit the transverse bar to be movable toward the ground by pivoting about the working tools a sufficient distance to allow the wheel structure to pass thereover.

12. In combination, a tractor having a wheel structure, a direct connected implement comprising a supporting frame adapted to be rigidly connected to the tractor, links pivotally carried by the supporting frame, connection means pivotally carried by the links, a transversely extending tool bar having ground working tools thereon, and means on the tool bar for adjustably connecting the tool bar and its tools to the connection means to allow further pivoting of the tool bar about its tools upon removal of the implement from the tractor so that the wheel structure may pass readily thereover.

13. In combination, a tractor having a wheel structure, a direct connectable implement structure attachable to the tractor including members extending along the sides of the tractor, and a transverse tool bar under the tractor and connected to the side members, said bar having a depressed portion and said implement structure adapted to be collapsible at the connection of the tool bar with the side members to lower the depressed portion toward the ground a sufficient distance to allow the wheel structure to pass thereover, upon detaching the implement from the tractor.

14. In combination, a tractor, a supporting frame adapted to be attached to the tractor including spaced, vertically extending members, a tool carrying member having a working tool thereon, a link member for pivotally connecting the tool-carrying member with the supporting frame including a main portion and an elongated portion extending at an angle with the main portion a sufficient distance as to pivot in the spaced vertical members of the supporting frame whereby the link member is held in rigid alinement with respect to the tractor.

WILLIAM S. GRAHAM.